June 16, 1931.  N. LAZZERI  1,810,428
BABY CARRIAGE
Filed June 18, 1929   2 Sheets-Sheet 1

Inventor
Nello Lazzeri

By   Milans & Milans
Attorneys

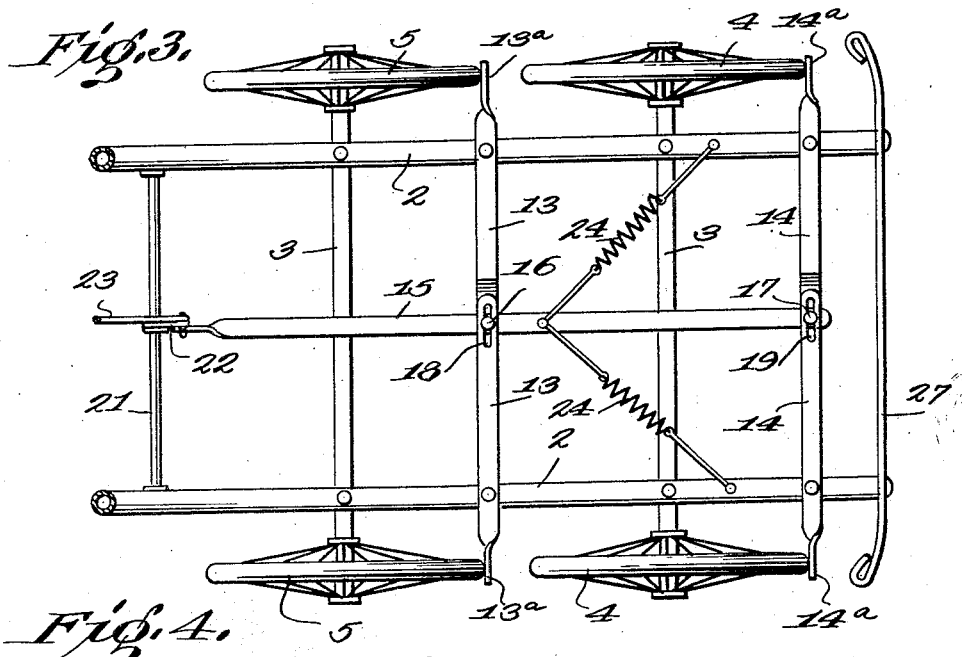

Patented June 16, 1931

1,810,428

UNITED STATES PATENT OFFICE

NELLO LAZZERI, OF VIRGINIA CITY, NEVADA

BABY CARRIAGE

Application filed June 18, 1929. Serial No. 371,919.

This invention relates to improvements in baby carriages and more particularly to improved brake mechanism for such vehicles.

An object of the invention is to provide an improved brake mechanism for baby carriages and the like, which will be of a simple, efficient nature, adapted to be easily controlled through the medium of the handle bar for propelling the carriage, and which will act automatically to prevent movement of the carriage when the hands of the attendant are removed from the handle bar.

The invention, with other objects and advantages thereof, and the particular construction, combination and arrangement of parts comprising the same, will be understood from the hereinafter contained detailed description, when considered in connection with the accompanying drawings, forming part hereof, and illustrating one embodiment of the invention.

In the drawings:

Fig. 3 is a top plan view of the running gear and part of the brake mechanism.

Fig. 4 is a detail rear elevation, with parts shown in section, of the push bars and handle bar.

Fig. 5 is a detail side elevation of a part of one of the push bars, the upper push bar section being locked in lower position.

Figure 1:
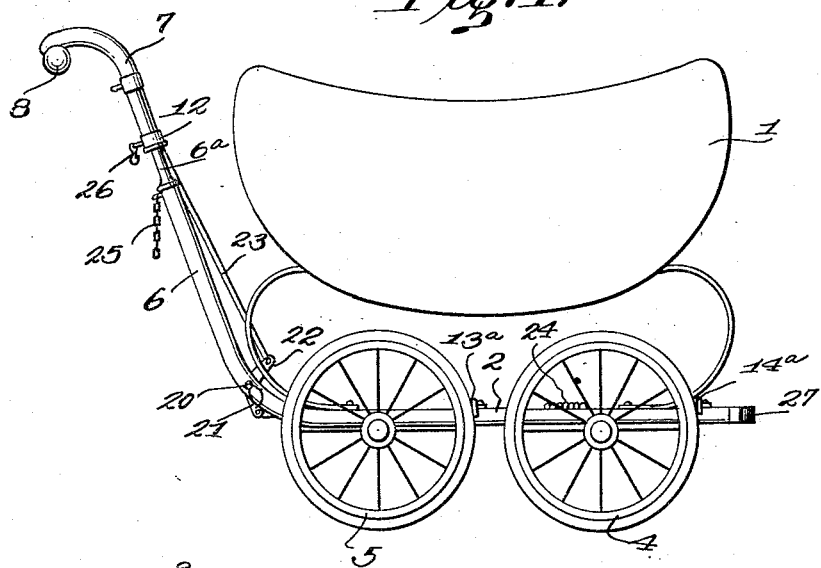
Figure 1 is an elevation of a baby carriage equipped with brake mechanism in accordance with the present invention.

The invention comprehends push bars having upper slidable sections to which the handle bar for propelling the vehicle is connected and which are connected to a brake device on the supporting frame so that when the handle bar is moved upwardly, the brake device will be moved into engagement with a wheel of the vehicle, and when the handle bar is pressed downwardly the brake will be released, and there being spring means acting to normally maintain the handle bar in elevated position, the brake being normally set and adapted to be released simply by downward pressure of the hands of the attendant upon the handle bar in propelling the carriage.

While a specific embodiment of the invention is illustrated in the drawings, it will of course be understood that changes and modifications may be made in the particular construction shown, and the invention may be embodied in other forms as will appeal to those skilled in the art and falling within the scope of the appended claims, without departing from the spirit of the invention.

Referring to a detail description of the particular embodiment of the invention illustrated in the drawings, 1 designates the body, 2 the side bars of the supporting frame, 3 the axles, and 4, 5, the front and rear wheels of a conventional form of baby carriage.

In accordance with the present invention, the carriage is provided with push bars, each comprising a lower section 6 and an upper section 7 slidable thereon. The lower sections 6 of the push bars are fixed to the supporting frame, the same being shown as extensions of the side bars 2. Mounted upon the upper slidable push bar sections 7 is the handle bar 8 for propelling the vehicle, said handle bar connecting said upper push bar sections together and being movable therewith relatively to the lower push bar sections 6. The upper push bar sections 7 have tubular end portions 7$^a$ telescoping over reduced end portions 6$^a$ of the lower sections 6. The reduced end portions 6$^a$ of the lower sections 6 slidably engage bearings 9 on the tubular end portions 7$^a$, and have parts 10 fitting within and slidably engaging the tubular end portions 7$^a$. The parts 10 are shown in the form of separate collars fixed in any suitable way to the end portions 6$^a$. Interposed between the lower push bar sections 6 and the upper sections 7 are coiled compression springs 11, said springs being arranged, as shown, within the tubular portions 7$^a$ of the upper slidable sections 7 surrounding the reduced end portions 6$^a$ of the lower sections 6 with their ends abutting against the parts 10 on the lower sections 6 and the bearings 9 on the upper sections 7. 12 designates closure caps having a detachable threaded engagement with the tubular end portions 7ª of the upper sections 7.

Figure 2:
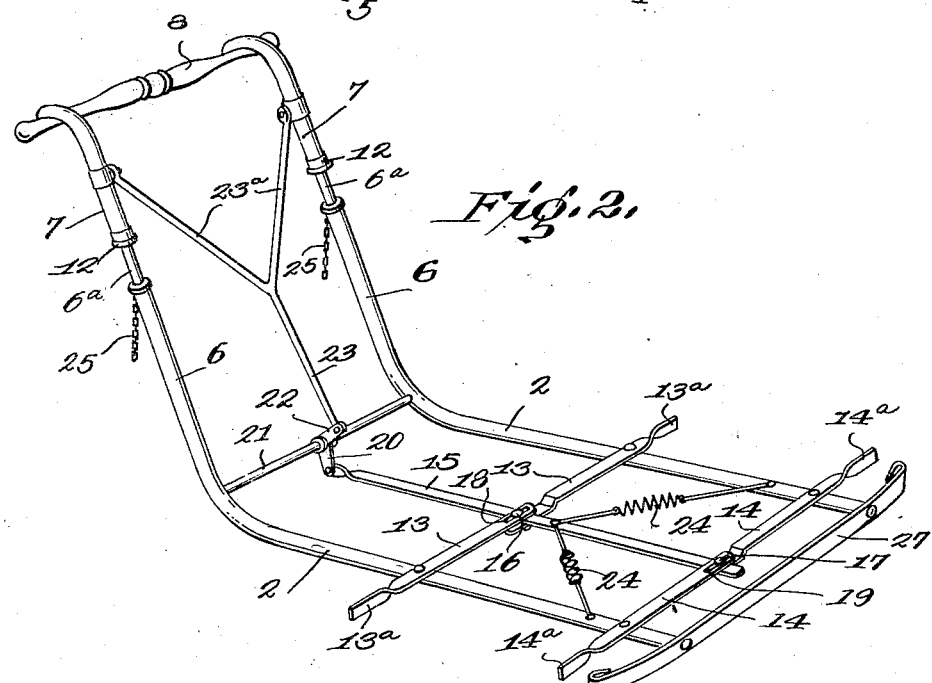
Fig. 2 is a detail perspective view of the supporting frame, push bars and brake mechanism.

Mounted upon the supporting frame are pairs of transversely disposed levers 13, 14 provided with wheel engaging or brake shoe portions 13ª, 14ª at their outer ends, said pairs of levers being arranged to cooperate respectively with the front and rear wheels 4, 5, each of said levers being pivoted intermediate its ends to one of the side bars 2 of the supporting frame to swing horizontally to carry its wheel engaging portion into and out of engagement with the tire of one of the wheels 4, 5. The pairs of levels 13, 14, are connected at their inner end portions to a longitudinally extending rod 15 to operate in unison, said rod having studs 16, 17, engaging slots 18, 19, in the inner end portions of said levers. The rod 15 at its rear end is pivotally connected with an arm 20 of an angle lever, which is mounted for vertical oscillation upon a transverse shaft or bar 21 located at the rear of the side bars 2, said shaft or bar being shown secured to the lower push bar sections 6. To the other arm 22 of the angle lever is pivotally connected one end of a rod 23. This rod 23 at its other end has branches 23ª which are pivotally connected to the upper slidable push bar sections 7, the connection between the pairs of levers 13, 14, and the upper slidable push bar sections 7 being such that when the handle bar 8 and upper push bar sections 7 are moved upwardly to the position illustrated in Figures 1, 2 and 4 of the drawings, the pairs of levers 13, 14 will be moved simultaneously to carry their wheel engaging portions 13ª, 14ª into engagement with the wheels 4 and 5, as shown in Figure 3, and upon downward pressure of the handle bar 8 said pairs of levers 13, 14 will be swung to move their wheel engaging portions 13ª, 14ª out of engagement with the wheels 4 and 5.

The coiled expansion springs 11 act to normally maintain the upper slidable push bar sections and the handle bar 8 forced upwardly in elevated position, the brake mechanism being normally set to hold the carriage against movement. As will be understood by a relatively slight downward pressure upon the handle bar 8, the brake mechanism is released and held in operative position.

Tension springs 24—24, may also be employed, if desired, to assist the coiled springs 11—11, in maintaining the upper push bar sections 7 and handle 8 in elevated position, said springs being arranged as shown with the opposite ends thereof connected respectively with the longitudinal rod 15 and the side bars 2 of the supporting frame.

Means is provided for locking the upper push bar sections 7 in lower position to the lower push bar sections 6, as illustrated in Figure 5 of the drawings, and locking the brake mechanism in inoperative position. Any suitable means may be employed for this purpose, that shown in the present instance comprising chain sections 25 secured to the lower push bar sections 6, and snap hooks 26 on the upper push bar sections 7, the links of said chain sections 25 being adapted to be engaged with the snap hooks 26, as shown in Figure 5, when the upper push bar sections 7 are moved to lower position.

27 designates a fender mounted on the forward ends of the side bars 2 of the supporting frame.

It will be noted that the special construction and arrangement of parts hereinbefore set forth, provides brake mechanism of a simple, efficient nature, adapted to be easily controlled through the handle bar for propelling the carriage, the brake mechanism acting automatically to hold the carriage against movement when the hands of the attendant are removed from the handle bar, and being easily released and held in inoperative position solely by downward pressure upon the handle bar in propelling the carriage, the handle bar being entirely free or unobstructed by other parts.

What I claim is:

1. In a baby carriage, the combination with the supporting frame, axles and wheels, of push bars each comprising a lower section fixed to the supporting frame and an upper section slidable on the lower section, a handle bar for propelling the vehicle rigidly connected with the upper slidable push bar sections, a brake mounted on the supporting frame for movement into and out of engagement with one of the wheels, a connection between said brake and the upper slidable push bar sections whereby when said handle bar is moved upwardly the brake will be moved into engagement with the wheel, and when pressed downwardly the brake will be moved out of engagement with the wheel, and spring means acting to normally maintain said handle bar in its elevated position.

2. In a baby carriage, the combination with the supporting frame, axles and wheels, of push bars each comprising a lower section fixed to the supporting frame and an upper section slidable on the lower section, a handle bar for propelling the vehicle rigidly connected with the upper slidable push bar sections, a brake mounted on the supporting frame for movement into and out of engagement with one of the wheels, a connection between said brake and the upper slidable push bar sections whereby when said handle bar is moved upwardly the brake will be moved into engagement with the wheel, and when pressed downwardly the brake will be moved out of engagement with the wheel, spring means acting to normally maintain said handle bar in its elevated position, and means for locking the upper push bar sections in lower position to the lower push bar sections.

3. In a baby carriage, the combination with the supporting frame, axles and wheels, of push bars each comprising a lower section fixed to the supporting frame and an upper section slidable on the lower section, one of said sections having a tubular end part telescoping with an end part of the other section, and a coiled expansion spring arranged within the tubular part of one of the sections with the ends abutting against a portion on each of the sections, a handle bar for propelling the vehicle connected with the upper slidable push bar sections, a brake mounted on the supporting frame for movement into and out of engagement with one of the wheels, and a connection between said brake and the upper slidable push bar sections whereby when said handle bar is moved upwardly the brake will be moved into engagement with the wheel, and when pressed downwardly, the brake will be moved out of engagement with the wheel, said expansion springs acting to normally maintain the slidable push bar sections and handle bar in elevated position.

4. In a baby carriage, the combination with the supporting frame, axles and wheels, of push bars each comprising a lower section fixed to the supporting frame and an upper section slidable on the lower section, one of said sections having a tubular end part telescoping with an end part of the other section, a coiled expansion spring arranged within the tubular part of one of the sections with the ends abutting against a portion on each of the sections, a handle bar for propelling the vehicle connected with the upper slidable push bar sections, a brake mounted on the supporting frame for movement into and out of engagement with one of the wheels, a connection between said brake and the upper slidable push bar sections whereby when said handle bar is moved upwardly the brake will be moved into engagement with the wheel, and when pressed downwardly, the brake will be moved out of engagement with the wheel, said expansion springs acting to normally maintain the slidable push bar sections and handle bar in elevated position, and means for locking each slidable push bar section in lower position to its lower push bar section, said means comprising a hook on one of said sections and a chain secured to the other section and adapted to have a link thereof engaged with the hook of the other section.

5. In a baby carriage, the combination with the supporting frame, axles and wheels, of push bars each comprising a lower section fixed to the supporting frame and an upper section slidable on the lower section, said upper section having a tubular end part telescoping over an end part of the lower section, and a coiled expansion spring arranged within the tubular end part of each one of the upper sections with its ends abutting against portions of each of the sections, a handle bar for propelling the vehicle connected with the slidable push bar sections, a brake mounted on the supporting frame for movement into and out of engagement with one of the wheels, and a connection between said brake and the slidable push bar sections whereby when said handle bar is moved upwardly the brake will be moved into engagement with the wheel and when pressed downwardly the brake will be moved out of engagement with the wheel, said expansion springs acting to normally maintain the slidable push bar sections and handle bar in elevated position.

6. In a baby carriage, the combination with the supporting frame, axles and wheels, of push bars each comprising a lower section fixed to the supporting frame and an upper section slidable on the lower section, a handle bar for propelling the vehicle rigidly connected with the upper push bar sections, a pair of levers pivoted intermediate their ends to the frame at opposite sides thereof, to swing horizontally, said levers being provided with wheel engaging portions and adapted to swing to move the same into and out of engagement with the rims of the rear wheels, connecting means between the upper push bar sections and the inner end portions of said brake levers whereby when said handle bar is moved upwardly the wheel engaging portions of the brake levers will be moved into engagement with the rear wheels, and when pressed downwardly the wheel engaging portions will be moved out of engagement with said wheels, said connecting means including an angle lever supported for oscillation vertically near the rear end of the supporting frame, a rod connecting the inner end portions of said levers to one arm of said angle lever, a rod extending longitudinally intermediate the push rods and connected at one end to the other arm of the angle lever, said rod at its other end having laterally and rearwardly extending branches connected respectively with the upper slidable push bar sections, and spring means acting to normally maintain said handle bar in its elevated position.

7. In a baby carriage, the combination with the supporting frame, axles and wheels, of push bars each comprising a lower section fixed to the supporting frame and an upper section slidable on the lower section, a handle bar for propelling the vehicle rigidly connected with the upper push bar sections, a pair of brake levers positioned forwardly of each pair of wheels, said pairs of levers each having wheel engaging portions and being pivotally mounted intermediate their ends on the supporting frame to swing horizontally to move their wheel engaging portions into and out of engagement respectively with the front and rear wheels, connecting means between the upper push bar sections and the inner end portions of said levers whereby when said handle bar is moved upwardly the wheel engaging portions of said levers will be moved into engagement with the wheels, and when pressed downwardly the wheel engaging portions will be moved out of engagement with the wheels, said means including an angle lever supported for oscillation vertically at the rear part of the supporting frame, a rod extending longitudinally intermediate the sides of the frame from front to rear thereof and connecting the inner end portions of the two pairs of levers to one arm of said angle lever, a rod connected at one end to the other arm of said angle lever and having branches connected respectively with the upper push bar sections, and spring means acting to normally maintain said handle bar in its elevated position.

8. In a baby carriage, the combination with the supporting frame, axles and wheels, of push bars each comprising a lower section fixed to the supporting frame and an upper section slidable on the lower section, a handle bar for propelling the vehicle rigidly connected with the upper slidable push bar sections, a brake mounted on the supporting frame for movement into and out of engagement with one of the wheels, a connection between said brake and one of the slidable push bar sections whereby when said handle bar is moved upwardly the brake will be moved into engagement with the wheel, and when pressed downwardly the brake will be moved out of engagement with the wheel, and spring means acting to normally maintain said handle bar in its elevated position.

9. In a baby carriage, the combination with the supporting frame, axles and wheels, of push bars each comprising a lower section fixed to the supporting frame and an upper section slidable on the lower section, a handle bar for propelling the vehicle rigidly connected with the upper slidable push bar sections, a brake mounted on the supporting frame for movement into and out of engagement with one of the wheels, an operative connection between said brake and the handle bar whereby when said handle bar is moved upwardly the brake will be moved into engagement with the wheel, and when pressed downwardly the brake will be moved out of engagement with the wheel, and spring means acting to normally maintain said handle bar in its elevated position.

In testimony whereof I hereunto affix my signature.

NELLO LAZZERI.